United States Patent
Nygaard et al.

(10) Patent No.: US 11,625,762 B2
(45) Date of Patent: Apr. 11, 2023

(54) METHOD, MEDIUM, AND SYSTEM FOR SOCIAL MEDIA-BASED RECOMMENDATIONS

(71) Applicant: eBay Inc., San Jose, CA (US)

(72) Inventors: Valerie Nygaard, Saratoga, CA (US); Ryan Lindsey Helft, Palo Alto, CA (US)

(73) Assignee: EBAY INC., San Jose, CA (US)

( * ) Notice: Subject to any disclaimer, the term of this patent is extended or adjusted under 35 U.S.C. 154(b) by 77 days.

(21) Appl. No.: 17/386,732

(22) Filed: Jul. 28, 2021

(65) Prior Publication Data

US 2021/0358009 A1 Nov. 18, 2021

Related U.S. Application Data

(63) Continuation of application No. 14/457,963, filed on Aug. 12, 2014, now Pat. No. 11,120,491.
(Continued)

(51) Int. Cl.
*G06Q 30/00* (2012.01)
*G06Q 30/0601* (2023.01)
(Continued)

(52) U.S. Cl.
CPC ..... *G06Q 30/0631* (2013.01); *G06Q 30/0282* (2013.01); *G06Q 50/01* (2013.01)

(58) Field of Classification Search
CPC . G06Q 30/0631; G06Q 30/0282; G06Q 50/01
See application file for complete search history.

(56) References Cited

U.S. PATENT DOCUMENTS 8,095,432 B1 * 1/2012 Berman ................. G06Q 10/10
705/26.7
8,290,964 B1 10/2012 Guha
(Continued)

FOREIGN PATENT DOCUMENTS

CN 101685458 A 3/2010
CN 105706132 A 6/2016
(Continued)

OTHER PUBLICATIONS

Hu, Minqing, and Bing Liu. "Mining opinion features in customer reviews." AAAI. vol. 4. No. 4. (Year: 2004).*
(Continued)

*Primary Examiner* — Matthew E Zimmerman
(74) *Attorney, Agent, or Firm* — Schwegman Lundberg & Woessner, P.A.

(57) ABSTRACT

A user may request a recommendation for an item from other users. Other users may respond to the request by recommending for or against items. Users may up-vote or down-vote the recommendations or responses of other users. The recommendations of the other users may be used to identify items and provide one or more recommendations to the requesting user. The original question and the responses may form a conversation thread. The recommendations may be inserted into the thread as responses, may be presented alongside the thread, or may be presented at the end of the thread. The recommendations may be based on one or more attributes of the user. The weight of the recommendations provided by other users may vary.

20 Claims, 11 Drawing Sheets

Related U.S. Application Data

(60) Provisional application No. 61/881,810, filed on Sep. 24, 2013.

(51) Int. Cl.
   *G06Q 30/0282* (2023.01)
   *G06Q 50/00* (2012.01)

(56) References Cited

U.S. PATENT DOCUMENTS

| | | | |
|---|---|---|---|
| 11,120,491 | B2 | 9/2021 | Nygaard et al. |
| 2008/0201368 | A1* | 8/2008 | Lee ............... G06F 16/958 705/26.1 |
| 2009/0172021 | A1 | 7/2009 | Kane et al. |
| 2010/0057569 | A1* | 3/2010 | Cantelmo ............ G06Q 30/00 705/14.55 |
| 2010/0287033 | A1 | 11/2010 | Mathur |
| 2010/0313141 | A1 | 12/2010 | Yu et al. |
| 2011/0106746 | A1 | 5/2011 | Ventilla et al. |
| 2012/0265635 | A1 | 10/2012 | Forsblom |
| 2012/0308140 | A1 | 12/2012 | Ambrus et al. |
| 2013/0024471 | A1 | 1/2013 | Mitrovic |
| 2013/0085893 | A1 | 4/2013 | Bhardwaj et al. |
| 2013/0185175 | A1 | 7/2013 | Roozen et al. |
| 2015/0088684 | A1 | 3/2015 | Nygaard et al. |

FOREIGN PATENT DOCUMENTS

| | | | |
|---|---|---|---|
| KR | 10-2012-0085707 A | 8/2012 | |
| KR | 10-2013-0038547 A | 4/2013 | |
| KR | 10-2014-0028064 A | 3/2014 | |
| WO | WO-0233628 A2 * | 4/2002 | ............ G06Q 30/02 |
| WO | 2015/048141 A1 | 4/2015 | |

OTHER PUBLICATIONS

Koren, Yehuda, Robert Bell, and Chris Volinsky. "Matrix factorization techniques for recommender systems." Computer 42.8 (2009): 30-37. (Year: 2009).*
Non-Final Office Action received for U.S. Appl. No. 14/457,963, dated Oct. 19, 2017, 17 Pages.
Advisory Action received for U.S. Appl. No. 14/457,963, dated Jul. 13, 2018, 2 pages.
Advisory Action received for U.S. Appl. No. 14/457,963, dated Apr. 2, 2021, 2 Pages.
Appeal Decision Received for U.S. Appl. No. 14/457,963, dated Jul. 2, 2020, 18 Pages.
Corrected Notice of Allowability Received for U.S. Appl. No. 14/457,963, dated Aug. 5, 2021, 4 Pages.
Examiner Answer to Appeal Brief received for U.S. Appl. No. 14/457,963, dated Jul. 19, 2019, 6 pages.
Final Office Action received for U.S. Appl. No. 14/457,963, dated Apr. 16, 2019, 9 pages.
Final Office Action Received for U.S. Appl. No. 14/457,963, dated Jan. 29, 2021, 11 pages.
Final Office Action Received for U.S. Appl. No. 14/457,963 dated May 8, 2018, 12 pages.
Non-Final Office Action received for U.S. Appl. No. 14/457,963, dated Oct. 4, 2018, 10 pages.
Non-Final Office Action Received for U.S. Appl. No. 14/457,963, dated Oct. 16, 2020, 18 pages.
Notice of Allowance Received for U.S. Appl. No. 14/457,963, dated Jun. 1, 2021, 17 pages.
Coffman,"Why You Should Not Build a Recommendation Engine", Retrieved from the internet URL:<http://www.datacommunitydc.org/blog/2013/05/recommendation-engines-why-you-shouldnt-build-one>, Data Community DC, May 21, 2013, 12 pages.
First Examiner Report received for Australian Patent Application No. 2014326751, dated Oct. 24, 2016, 3 Pages.
Office Action received for Canadian Patent Application No. 2,924,670, dated Dec. 14, 2016, 4 Pages.
International Search Report received for PCT Patent Application No. PCT/US2014/057230, dated Jan. 9, 2015, 2 pages.
Written Opinion received for PCT Patent Application No. PCT/US2014/057230, dated Jan. 9, 2015, 5 pages.
International Preliminary Report on Patentability received for PCT Application No. PCT/US2014/057230, dated Apr. 7, 2016, 7 pages.
Kant et al., "Enhancing Recommendation Quality of Content-based Filtering through Collaborative Predictions and Fussy Similarity Measures", Retrieved from the internet URL:<https://ac.els-cdn.com/S1877705812020310/1-s2.0-S1877705812020310-main.pdf?_tid=860ea9b2-b7f5-11e7-9e5c-00000aab0f02&acdnat=1508765260_3d810f038c022f92bede3aae6de8e80f>, ICMOC. Procedia Engineering 38, 2012, 939-944.
Uluyagmur, "Content-Based Movie Recommendation Using Different Feature Sets", Retrieved from the internet URL:<http://www.iaeng.org/publication/WCECS2012/WCECS2012_pp517-521.pdf>, Proceeding of the WCECS, vol. 1,, Aug. 10, 2012, 5 pages.
Chen et al., "SVDFeature: A Toolkit for Feature-based Collaborative Filtering", Retrieved from the internet URL: <http://www.jmlr.org/papers/volume13/chen12a/chen12a.pdf>, Journal of Machine Learning Research Dec. 13, 2012, 3619-3622.
Second Examination Report Received for Australian Patent Application No. 2017203689, dated Sep. 29, 2018, 4 pages.
First Examination Report Received for Australian Patent Application No. 2017203689, dated May 18, 2018, 3 pages.
Re-Examination Notification Received for Chinese Patent Application No. 201480060571.2, dated Jun. 25, 2021, 19 Pages with English Translation.
Office Action received for Chinese patent Application No. 201480060571.2, dated May 28, 2019, 30 pages (12 pages of official copy and 18 pages of English translation).
Office Action received for Chinese Patent Application No. 201480060571.2, dated Dec. 11, 2018, 29 pages with English Translation.
Decision of Rejection Received for Chinese Patent Application No. 201480060571.2, dated Sep. 25, 2019, 17 pages (9 pages official copy and 8 pages English translation).
Office Action received for Canada Patent Application No. 2,924,670, dated Dec. 4, 2018, 6 pages.
Office Action received for Canadian Patent Application No. 2,924,670, dated Feb. 5, 2018, 5 pages.

\* cited by examiner

500

510 — Ryan Helft
July 8

I am finally thinking about replacing the Explorer. Can't be a minivan, but a third row would really be handy. Recommendations?

520 — Like - Comment - Promote - Share

530a — Ray
I'd be happy to sell you my Q7 for more than I paid...

Just kidding. I do like it though.
July 8 at 10:23 am via mobile - Like

530b — Jordana
Lexus GX470 (stopped making in 2010... they have the new GX460 but I think it looks like a transformer)
July 8 at 10:27am - Like 530c — Arne
Depends on how many persons -- take into account their ages, too -- you will need to seat.
July 8 at 10:29am - Like 530d — John
MDX
July 8 at 10:34am -- Like -- 1 thumb 530e — Brooke
playing the answer straight. I like my highlander -- very doable with 3 and the newer models have a split back seat as well
July 8 at 10:41 am -- Like -- 1 thumb 530f — Amy
I hate my MDX. It's got horrible rearview visibility. Wish I had gone with the Mazda SUV.
July 8 at 10:48am - Like

530g — Tore
There are some recent wagons and cross-overs with 3rd row seating that can be picked up at reasonable prices. Look at Mercedes E350 wagon, Mercedes R350 and Volvo XC70.
July 8 at 11:06am - Like 530h — Raj
I've heard very good things about the GMC Acadia. It has captain's chairs, so super easy to access the third row seating. Don't get a Pilot.
July 8 at 11:13am - Like 530i — Jake
Not kidding ... look at the new Dodge Durango. It's gotten a total overhaul. We were close to buying it but ended up going safe with the Pilot ... wish we hadn't.
July 8 at 11:33am - Like 530j — Laura
Tesla!
July 8 at 11:36am via mobile - Like 530k — Scott
We have an Acadia; it's great
July 8 at 11:41am via mobile - Like 530l — Jami
the honda pilot drives nice, but the third row is very cramped, especially with boosters/carseats. I'm curious about the acadia and the ford expedition hybrid.
July 8 at 11:56am - Like 530m — Sarah
I have a Mazda 5. Like a mini-mini van. Sliding doors are great for the kids when parked in small spaces. Good price and third row when you need it (but not usable for everyday). Wish it was a little more "plush" but great for the price.
July 8 at 12:07pm via mobile - Like

Ryan
good point, Arne. We've got three kids, ages 8, 6 and 2 and two adults. Would be nice to be able to add some other kids when carpooling comes in handy.
July 8 at 12:15pm - Like

Rob
On my 2nd Acadia.
July 8 at 12:33pm - Like

Andrea
I like the way you think Laura. I'm also OK with this:
http://www.bmw.com/com/en/active_hybrid/overview.html > BMW Hybrid Cars: BMW ActiveHybrid
> www.bmw.com
> Overview of all BMW Hybrid vehicles from BMW ActiveHybrid: BMW ActiveHybrid 7, 5, and 3.

July 8 at 12:48pm -- Like -- Remove Preview

Josh
Um ... conversion van. Captains chairs. CB. VCR. Fold-to-bed rear bench seat. Airbrushed unicorn on the side. A little shag carpeting.
July 8 at 12:54pm via mobile -- Like -- 2 thumbs

Joie
I looove my Honda Pilot -- 3 rows.
July 8 at 1:18pm - Like

Rajeev
Hold out for the Model X next year...
July 8 at 1:20pm - Like

Carrie
Toyota Highlander
July 8 at 1:52pm via mobile - Like

Erin
We have the Mazda cx-9 and love it
July 8 at 2:40pm via mobile - Like

*FIG. 7*

METHOD, MEDIUM, AND SYSTEM FOR SOCIAL MEDIA-BASED RECOMMENDATIONS

CLAIM OF PRIORITY

The application is a Continuation of U.S. application Ser. No. 14/457,963, filed Aug. 12, 2014, which claims priority to U.S. Provisional Application No. 61/881,810, filed Sep. 24, 2013, each of which is hereby incorporated by reference in its entirety.

TECHNICAL FIELD

The subject matter disclosed herein generally relates to the processing of data. Specifically, the present disclosure addresses systems and methods for social media-based recommendations.

BACKGROUND

Users can browse items on merchant and auction sites to find desired items. The sites may provide a search function or divide items into categories, to help users find items more quickly. Merchant and auction sites can also provide recommendations of items to users based on past behavior of the users.

BRIEF DESCRIPTION OF THE DRAWINGS

Some embodiments are illustrated by way of example and not limitation in the figures of the accompanying drawings.

FIGS. 5-7 are screen diagrams illustrating an example conversation thread suitable for social media-based recommendations, according to some example embodiments.

DETAILED DESCRIPTION

Figure 1:
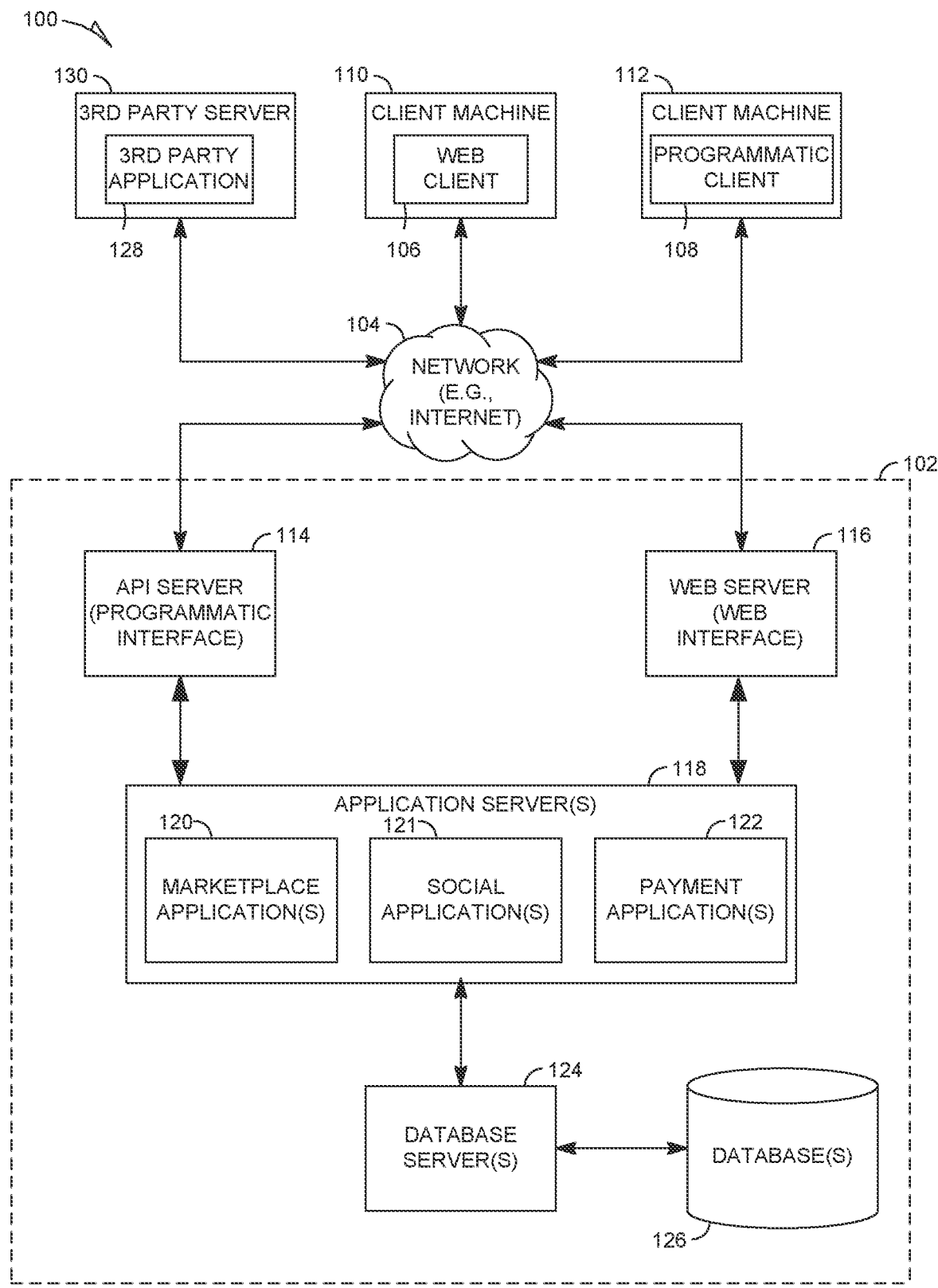
FIG. 1 is a network diagram illustrating a network environment suitable for social media-based recommendations, according to some example embodiments.

Example methods and systems are directed to social media-based recommendations. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A computer user may have an account on a social network (e.g., Facebook, Twitter, LinkedIn, etc.). The user can have relationships with other users in the social network (e.g., family, friends, and so on). The user can also have relationships with other entities in the social network (e.g., the user may be a member of a group, an employee of a company, etc.). The social network may be a social portion of a commerce site.

The user can request a recommendation for an item from other users. Other users can respond to the request by recommending for or against items. For example, one user may recommend a certain brand or product while another user may recommend against the brand and recommend a different brand or product. In some example embodiments, users are enabled to up-vote or down-vote the recommendations or responses of other users.

Items can be informational items (e.g., news articles, blogs, images, multimedia content, etc.), transactional items (e.g., items for sale online, items for sale in brick-and-mortar locations, items wanted online, items wanted in brick-and-mortar locations), or other types of items. The item can be an item for purchase (e.g., a car, a pair of shoes, a movie ticket, etc.), an article (e.g., a news article, a buying guide, etc.), a web site (e.g., a news site, a shopping site, etc.), a person (e.g., a social contact, a professional contact, a domain expert, etc.), or any other item that other users may be able to recommend. An item may be a collection of items. For example, each toy in a line of toys (e.g., a single Star Wars figure) can be treated as an item and the collection of toys in the line of toys (e.g., all Star wars figures) can also be treated as an item. As another example, a social media application or online marketplace application may facilitate the creation of collections of items by users and the created collections may be items available to be recommended.

The recommendations of the other users are used to identify items and automatically provide one or more recommendations to the user requesting the recommendation. The provided recommendations are presented in a user interface and operable to direct the user to the item. For example, the recommendation may be for a web site and presented as a hyperlink to the web site. As another example, the recommendation may be for a product available for purchase on another site and presented as a user interface ("UI") element that, when clicked on, presents the user with the opportunity to purchase the item without leaving the original site.

The original question and the responses form a conversation thread. The recommendations can be inserted into the thread as responses, presented alongside the thread, or presented at the end of the thread. The recommendations may be presented automatically or hidden unless requested by the user. The recommendations may be presented to all participants in the thread or only to the user requesting the recommendation.

The recommendation can be based on one or more attributes of the user. For example, a user may have identified a set of interests (e.g., a movie, a sports team, a band, a celebrity, a city, or any other item or category of items) and the recommendation may be based on the user's interests. Additionally, other information about the user may be known. To illustrate, a user may be located in New York City and have requested recommendations for shoes. Based on recommendations by other users and the user's location in New York City, a particular shoe at a particular shoe store in New York City can be recommended. As another illustration, a user may have indicated an interest in an actor and requested recommendations for movies. Other users may recommend several movies, one of which contains the actor. Accordingly, the user-recommended movie with the actor of interest can be recommended by the recommendation system.

The weight of the recommendations provided by other users may vary. For example, a user may set a weight for other users. To illustrate, a user may choose to give family members twice the weight of friends, or to give a user that typically gives bad advice a weight of zero, or even a negative weight. In some example embodiments, the weights for users are automatically generated, and may be based on the previous interactions of the recommending user with items and the previous interactions of other users with items recommended by the recommending user.

Interactions with items can include viewing items, bidding on items, buying items, subscribing to items, sharing the items on social networks. In some example embodiments, only a subset of the interactions is considered. For example, only buying an item may be considered to be an interaction with the item. Additionally, different types of interactions can be considered in a single embodiment. To illustrate, an example embodiment may consider any form of interaction by the current user to be an interaction but consider only purchases by other users to be interactions. Thus, while the description below frequently refers to interactions, the various possible combinations of types of interactions should be recognized as being within the scope of the present inventive subject matter.

In some example embodiments, interactions are grouped into categories of relevance and the categories utilized as a basis for the selection of results. An example of a relevance category may be interactions that indicate the end of a shopping session. Interactions that may be included in such a relevance category could include, for example, purchasing an item, performing a new search in a different item category, ending the browsing sessions, navigating to a completely different website, etc.

As mentioned above, the weight attributed to a recommendation by a user can be based on the interactions of the user with items. For example, a user that interacts with many clothing items may be given a higher weight when recommending clothing items. Similarly, a user whose recommendations are often followed (e.g., whose recommendations often result in interactions with the recommended items) may be given a greater weight. The weight can be based on the types of interactions that occur. For example, a user whose recommendations frequently result in item purchases may have a greater weight than a user whose recommendations frequently result in item views without leading to purchases. User weights can be broken down by category. For example, a user whose food recommendations are often followed but whose clothing recommendations are rarely followed may have a high weight given to his food recommendations but a low weight given to his clothing recommendations. Example interactions that may improve the weight given to a user for a recommendation include items bought and sold by the user (e.g., a user who has bought and sold many guitars may have greater credibility when recommending guitars), items commented on by the user (e.g., a user who shares opinions frequently regarding a category of products may have greater credibility within that category), comments by the user that are shared by other users (e.g., a user whose comments on a topic are frequently shared by other users may have greater credibility on the topic), and the field of expertise of the user (e.g., a user with a Music degree may have greater credibility with respect to instrument recommendations).

FIG. 1 is a network diagram depicting a network environment 100, within which one example embodiment can be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120, social applications 121, and payment applications 122. The application servers 118 are, in turn, shown to be coupled to one or more database servers 124 that facilitate access to one or more databases 126.

The marketplace applications 120 provide a number of marketplace functions and services to users that access the networked system 102. The social applications 121 provide a number of social functions and services to users that access the networked system 102. The social applications 121 may use a relationship graph to track relationships between users (e.g., friends). The social applications 121 may allow users to share messages, photos, videos, and other forms of communication and data. The payment applications 122 provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace, social, and payment applications 120, 121, and 122 are shown in FIG. 1 to each form part of the networked system 102, it will be appreciated that, in alternative embodiments, the social applications 121 may form part of a social network that is separate and distinct from the networked system 102. Likewise, the payment applications 122 may form part of a payment service that is separate and distinct from the networked system 102.

Further, while the network environment 100 shown in FIG. 1 employs a client-server architecture, the embodiments of the present invention are of course not limited to such an architecture, and could equally well find application in a distributed, or peer-to-peer, architecture system, for example. The various marketplace, social, and payment applications 120, 121, and 122 could also be implemented as standalone software programs, which do not necessarily have networking capabilities.

The web client 106 accesses the various marketplace, social, and payment applications 120, 121, and 122 via the web interface supported by the web server 116. Similarly, the programmatic client 108 accesses the various services and functions provided by the marketplace, social, and payment applications 120, 121, and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102. As another example, the programmatic client 108 may be a social networking application to enable users to communicate with members of a social network (e.g., via the social application 121).

The client machine 110 or 112 can present information to a user. For example, the client machine 110 may be running a web browser presenting a web page. The user may indicate a request for a recommendation to the client machine 110. A request for a recommendation defines the parameters of the request. A request for a recommendation can include an alphanumeric string, an image, audiovisual data, or any suitable combination thereof. A request for a recommendation can include filters that exclude items complying with or not complying with the filter. A request for a recommendation may be composed of multiple elements. An element is a discrete portion of a request for a recommendation, such as a word or phrase in an alphanumeric string, an image, or a filter. For example, the user may type a request for a recommendation into a text field (e.g., a comment or message box), select an item to request recommendations for similar or related items, upload an image to request a recommendation for similar or related items, or any suitable combination thereof. One item is similar to another if they are substitutes for each other. For example, one television may be similar to another television. An item is related to another if they work together or are frequently purchased together. For example, peanut butter may be related to jelly, or a universal remote control may be related to a television.

The client machine 110 or 112 can submit a request for a recommendation to an application server 118 running a social application 121. The application server 118 can publish the request for a recommendation to other client machines 110 or 112. The other client machines 110 or 112 can submit responses to the request for recommendation. The responses to the request for recommendation may be published by the social application 121 to the requesting client machine 110 or 112. The social application 121 may generate an item recommendation for the requesting client machine 110 or 112. The recommendation may be for results within a certain category (e.g., a product category such as books, games, movies, furniture, etc. or a content category such as news, blogs, fiction, opinion, entertainment, and the like), with a certain attribute (e.g., produced within a certain date range, located within a geographic area, shipped in a certain way, sold in a particular way, etc.), or related to a certain entity (e.g., liked by a friend, of interest to a group, sold by a company, etc.). The generated item recommendation can be published to the requesting client machine 110 or 112.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, social, or payment functions that are supported by the relevant applications of the networked system 102.

Figure 2:
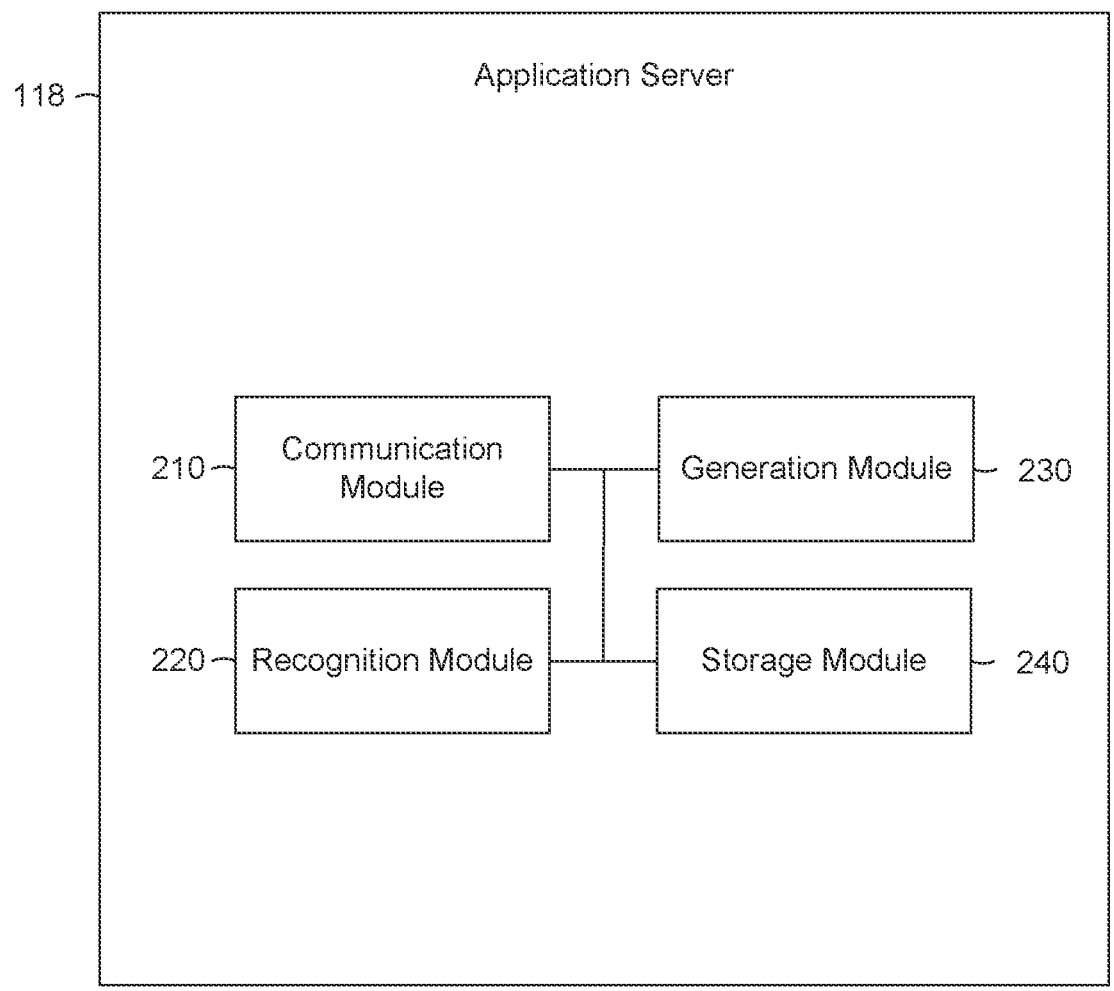
FIG. 2 is a block diagram illustrating components of an application server suitable for social media-based recommendations, according to some example embodiments.

FIG. 2 is a block diagram illustrating components of an application server 118 running a social application 121, according to some example embodiments. The application server 118 is shown as including a communication module 210, a recognition module 220, a generation module 230, and a storage module 240, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 controls communication with the client machine 110 and the database 126. The communication module 210 may also send data for storage on the application server 118 or the database 126.

The communication module 210 can receive a request for a recommendation from the client machine 110 or 112. Upon receiving a request for a recommendation, the recognition module 220 can parse the request for recommendation to identify a category of the request. To illustrate, the request may be "Can anyone recommend a good car?" For this request, the category may be "automobiles." As another illustration, the request may be, "My Explorer is just about dead. Can anyone recommend a good replacement?" Recognizing that the request is for a replacement for an Explorer, and that an Explorer is an automobile, the category may again be "automobiles." In some example embodiments, the category of the request is determined by identifying the category of items with the most items responsive to the request or which has received the most interactions based on similar requests.

The communication module 210 can receive responses to the request for a recommendation from other client machines 110 or 112. The communication module 210 may send the responses to the request to the requesting user, and provide the ability for the users to communicate via the social application 121. The recognition module 220 can also parse the responses to identify recommended items. To illustrate, the response may be "I'm happy with my Corolla." For this response, the item may be "Toyota Corolla." As another illustration, the response may be "The Tesla Model S got great reviews." For this response, the item may be "Tesla Model S." Additionally, the responses can be parsed to determine if the recommendations are positive or negative. For example, "I'm happy with my Corolla" is a positive recommendation, while "The transmission on my Corolla failed as soon as my warranty expired" is a negative recommendation.

The generation module 230 can generate a recommendation for an item based on the request for a recommendation and the responses to the request received from the client machines 110 or 112. For example, if the request for a recommendation indicates that the requested recommendation is for a car and several responses recommend a Toyota Corolla, the generation module 230 may generate a recommendation for a Toyota Corolla.

The generation module 230 can generate a recommendation for an item based on recommendations received from users without separately recognizing a request for a recommendation. For example, a news site may post an article about a product preview and invite user comments. The user comments may reflect opinions about items related to the previewed products. Based on the comments, the generation module 230 can generate an item recommendation.

The generation module 230 can also retrieve a location associated with the user from the storage module 240, or a location of the user may be communicated from the client machine 110 or 112 to the generation module 230 via the communication module 210. For example, the user can set a preferred location (e.g., a home address, a work address, or a vacation destination) as a preference, and the preferred location may be used as the user location by the generation module 230. As another example, the client machine 110 or 112 may have a built-in GPS sensor, and the location of the client machine 110 or 112 may be transmitted to the application server 118 along with the query.

The generated recommendation can be a recommendation for items local to the requesting user. For example, if the request is for an item to purchase, the generated recommendation may be for an item available to purchase from a retail location near to the requesting user. As another example, if the request is for sights to see, the generated recommendation may be for an attraction near to the requesting user.

Items presented to the querying user may be items for sale. For example, a user may be provided a recommendation for a remote-control car available for purchase at a local hobby store. Additionally or alternatively, information about online purchases of the item may also be presented. For example, an auction in an online marketplace of the same or a similar item may be presented. Similarly, a user may be provided information about an upcoming nearby concert and how to buy tickets locally may be presented to the user. Additionally or alternatively, information about online sales of the concert tickets may be presented.

The communication module 210 can send the recommendation provided by the generation module 230 to the client machine 110 or 112, for display to the user. For example, data may be transmitted to the web client 106 running on the client machine 110 using JavaScript Object Notation ("JSON"). JavaScript running in the web client 106 can parse the JSON object and add the recommendation to a web page, for viewing by the user.

Although this document generally refers to the "display" of information, the presentation of results to the user may be an audio presentation. For example, the names and addresses of important monuments, local stores, or upcoming events may be read aloud to the user. As another example, a user may be exploring a zoo, amusement park, museum, fair, or the like and receive audio instructions providing directions to a recommended exhibit or attraction.

Figure 3:
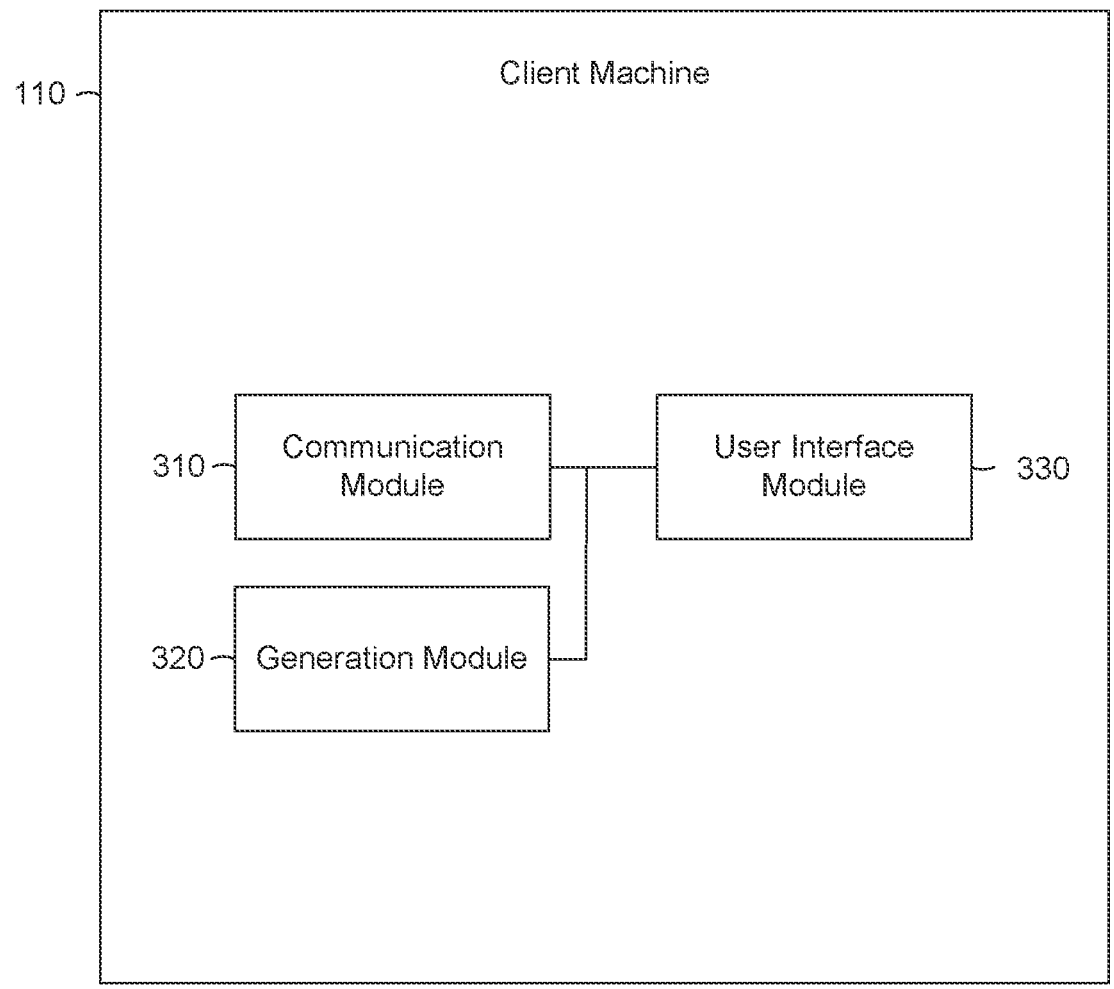
FIG. 3 is a block diagram illustrating components of a client machine suitable for social media-based recommendations, according to some example embodiments.

FIG. 3 is a block diagram illustrating components of a client machine suitable for social media-based recommendations, according to some example embodiments. The client machine 110 or 112 is shown as including a communication module 310, a generation module 320, and a user interface module 330, configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 can communicate with the application server 118, the network 104, or any suitable combination thereof. Information received via the communication module 310 may be presented (e.g., displayed on a display device or played on an audio device) via the user interface module 330. Information may be selected or requests for recommendations can be entered by a user using a user interface presented by the user interface module 330. The requests for recommendations may be communicated to the application server 118 via the communication module 310. The application server 118 can respond to the requests for recommendations with one or more recommendations, received by the communication module 310. Recommendations generated by the application server 118 can be received by the communication module 310 and presented to the user by the user interface module 330. For example, the recommendations may be presented in the form of a banner advertisement, a text advertisement, a message in a message thread, a pop-up window, or another user interface element.

The generation module 320 identifies the user's recommendation request and the responses, and generate an appropriate query. For example, the recommendation request and responses may be parsed on the client machine 110 or 112 to identify the category of the request and the recommended items. Based on the category, the recommended items, user data, and the like, a query can be generated. To illustrate, a thread created by a user that lives in Los Angeles who has requested a recommendation for a car and received several recommendations for a Toyota Corolla may cause the generation of a query for "Toyota Corolla in Los Angeles." The generated query can be transmitted to the application server 118 by the communication module 310 for processing. One or more results for the search query can be presented to the user as recommendations. In some example embodiments, the generation module 320 is not integrated into the social media tool. For example, the generation module 320 may be part of a web browser plug-in, capable of providing recommendations when the user interacts with social media websites without requiring the cooperation of those social media websites. In other example embodiments, the generation module 320 is integrated with the social media tool. For example, a social media app may use inter-process communications to inform a recommendation app of the recommendation request and responses.

The user interface module 330 may present updated recommendations as time passes or additional responses are received. For example, a new recommendation may be presented at set periods (e.g., every 5 minutes, every hour, and so on).

As another example, a new recommendation may be presented after each batch of comments is received. A batch of comments is a set of one or more comments that occur within a set period of time from each other. For example, if the timeout period is five minutes, then as long as fewer than five minutes passes between responses, the batch will continue to grow. Once the timeout period passes without a comment, the batch is complete. To illustrate, seven comments may be received with periods between them of thirty seconds to three minutes. Five minutes after the seventh comment is received, a recommendation may be presented. An hour later, another comment may be received, with no subsequent comments. Five minutes after this comment, another recommendation may be presented. In some example embodiments, the timeout period is calculated dynamically, based on the momentum of the thread. For example, the time period between the presentation of the request and the first response may be greater than the time period between the first response and the second response, indicating that the thread is gaining momentum. An increase in the time period may be detected as a decrease in momentum, and a recommendation presented when the decrease in momentum is detected. Machine learning algorithms may establish a method for calculating momentum and determining the time to insert the recommendation.

Other factors that can affect the timing of the presentation of recommendations by the user interface module 330 include choosing to present recommendations after a certain number of responses have been received, after a certain number of items have been identified, after a certain strength of recommendation has been reached (e.g., several users have agreed on a recommended product), or after an authority has weighed in. For example, a recommendation may be provided as soon as three responses are received, regardless of the content of those responses. As another example, a recommendation may be provided after three different items have been identified. As another example, a recommendation may be provided when a recommendation of strength 2 is calculated (e.g., a recommendation by a single user of weight 2, a recommendation by two users of weight 1, or a twice-liked recommendation from a user of weight 1, where each like has a weight of 0.5). In some example embodiments, a recommendation is provided when an item is recommended by a certain number of users, regardless of weight. In other example embodiments, a recommendation is provided as soon as a user with a higher weight recommends an item, regardless of the number of items identified.

The user interface module 330 can present recommendations at an identified time of day. For example, the user receiving the recommendation or the server providing the recommendation can set a particular time or times for presenting or updating recommendations (e.g., at 7:30 AM, 12:05 PM, and 6:25 PM). The identified time of day may be based on an analysis of prior user interactions. For example, if a recommendation provided during the workday generates a higher interaction rate than recommendations provided at night, recommendations may be provided as soon as they are generated for requests posted during the workday, but delayed until the next morning for requests posted at night. The identified time of day based on prior user interactions may be based on the user asking for the recommendation, other users that have asked for recommendations in the same category, all users, and the like. For example, if the user asking for the recommendation has interacted with many items between the hours of 6 and 9 PM, but never interacted with an item between the hours of 1 and 6 PM, any recommendation generated between 1 and 6 PM may be held until 6 PM for that user.

Figure 4:
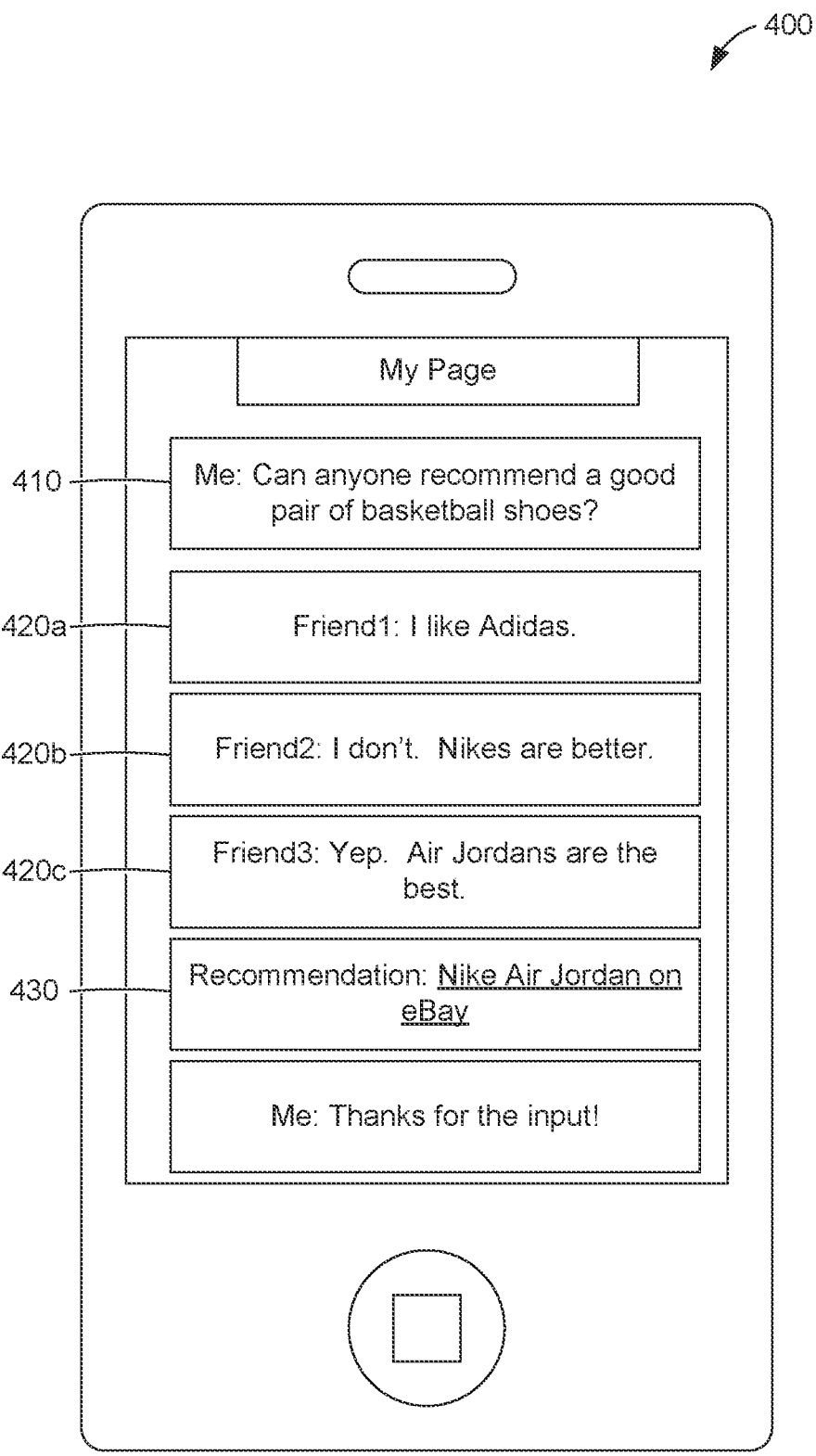
FIG. 4 is a block diagram illustrating a user interface suitable for social media-based recommendations, according to some example embodiments.

FIG. 4 is a block diagram 400 illustrating a user interface suitable for social media-based recommendations, according to some example embodiments. As can be seen in block diagram 400, the user interface is titled "My Page" and includes a request for a recommendation 410, three responses to the request 420a-420c, and a recommendation 430 for an item. The recommendation 430 can be presented as a hyperlink, operable to retrieve more information about the recommended item. Additional information can also be presented about the recommended item, such as location, price, color, style, size, modification date, and so on. The information presented may depend on the item itself. For example, a news article item may be presented along with its publication date, an online auction item may be presented with its current price and auction closing date, or an item at a retail store location may be presented with the store address.

The recommendation 430 can include information regarding one or more items. One or more nearby products may be displayed in response to the query, indicating items for sale that are near to the user. For example, a store near the user may have a recommended item for sale. The recommendation 430 can also indicate items that are wanted for purchase. For example, a coin shop or a pawn shop may be interested in purchasing items from the user. One or more nearby events may be recommended, indicating events that are near to the user, such as concerts, festivals, movies, sporting events, and the like. One or more nearby locations may be recommended, indicating locations that are near to the user, such as monuments, stores, gas stations, restaurants, stadiums, and other locations of interest. One or more nearby people may be recommended, indicating people that are near to the user, such as friends of the user, celebrities, and other people of interest. In some example embodiments, one or more of the items, events, locations, and people displayed is chosen based on an advertising fee paid.

Interactions with the recommendation 430 may be tracked and added to a tracking database. For example, the recommendation 430 may be based on the recommendations provided by Friend2 and Friend3. A record corresponding to the recommendation 430 may be created, and linked to the users corresponding to Friend2 and Friend3. After receiving the recommendation 430, the user "Me" may click on, touch, or otherwise interact with the recommendation 430. When the recommendation 430 is interacted with, the record for the recommendation 430 can be updated. For example, if the text "Nike Air Jordan on eBay" is a hyperlink, the hyperlink may include an argument whose value is a unique identifier for the recommendation 430. Accordingly, when the user accesses the hyperlink, the server can identify and update the record corresponding to the recommendation 430. Additionally or alternatively, the hyperlink may direct the user to an intermediate server that tracks the use of the hyperlink and then redirects the user to the destination.

FIGS. 5-7 show a conversation thread 500. The conversation thread 500 includes a recommendation request 510, social media options 520, and comments 530a-530v.

An item to be recommended may be determined by aggregating the recommendations provided by the other users. The initial comment may contain the request for recommendation, as in the conversation thread 500, or a later comment in the thread may contain the request. In the thread 500, the comment "I am finally thinking about replacing the Explorer. Can't be a minivan, but a third row would really be handy. Recommendations?" may be detected as a request for a recommendation for a car, given identification of Explorer as a car and the explicit request for recommendations. In other cases, the request for recommendations may be inferred from the content of the comment, the category for which requests are sought may be made explicit, etc.

The comment 530a is "I'd be happy to sell you my Q7 for more than I paid . . . Just kidding. I do like it though." The comment 530a may be parsed to identify the "Q7" as being "like[d]," and the Q7 correlated using a database to be identified as a car.

The comment 530b, from another user, states "Lexus GX470 (stopped making in 2010 . . . they have the new GX460 but I think it looks like a transformer)." The comment 530b may be parsed to identify a recommendation for the "Lexus GX470" and a recommendation against the "GX460." The determination that a recommendation is for or against may be based on identification of words near the recommended product (e.g., "like" or "great" may indicate a positive recommendation while "hate" or "awful" may indicate a negative recommendation). Alternatively or additionally, the determination that a recommendation is for or against may be based on a human's interpretation of the comment, a natural-language parser's interpretation, etc. The comments 530a-530v may be aggregated, for example as in the table shown below.

| Item | Comments | | | | Net Result | Likes |
|---|---|---|---|---|---|---|
| Audi Q7 | 1 | | | | 1 | |
| Lexus GX 470 | 1 | | | | 1 | |
| Acura MDX | 1 | -1 | | | 0 | 1 |
| Toyota Highlander | 1 | 1 | | | 2 | 1 |
| Mercedes E350 | 1 | | | | 1 | |
| Mercedes R350 | 1 | | | | 1 | |
| Volvo XC 70 | 1 | | | | 1 | |
| GMC Acadia | 1 | 1 | 1 | | 3 | |
| Honda Pilot | -1 | -1 | 0 | 1 | -1 | |
| Dodge Durango | 1 | | | | 1 | |
| Tesla | 1 | | | | 1 | |
| Mazda 5 | 1 | | | | 1 | |
| BMW Hybrid | 1 | | | | 1 | |
| Conversion Van | 1 | | | | 1 | |
| Tesla Model X | 1 | | | | 1 | |
| Mazda CX-9 | 1 | | | | 1 | |

The value of each comment may be based on the weight of the user providing the recommendation. For example, if the user "Ray," providing the comment 530a, had a weight of two when recommending cars, then the value in the first column next to the Audi Q7, recommended by Ray, could be 2 instead of 1. In that case, the Net Result value for the Audi Q7 would be 2 instead of 1. Also shown in the table are the number of likes received by each recommendation. In the example embodiment shown, the number of likes is not used to determine the net recommendation value. In other example embodiments, a like may be considered as equal in value to a comment or equal to a fraction of a comment. For example, one like was received for a comment recommending the Acura MDX. The like may be treated as half of a comment, bringing the net score for the Acura MDX to 0.5.

A user's weight may be negative. For example, if the user asking for the recommendation has frequently down-voted the recommending user's previous recommendations, a positive recommendation by the recommending user may be treated as a negative recommendation.

Information about the user requesting the recommendation may also be considered in generating the recommendation. For example, age, gender, location, income level, education level, known product affinities (e.g., preferred brands, items owned, etc.), and the like may be considered. To illustrate, a request for recommendations for shoes by a woman may generate recommendations for women's shoes, while the same responses by users to a request by a man may generate recommendations for men's shoes.

In some example embodiments, the level of expertise regarding the category for which a recommendation is requested or the level of vagueness of the recommendation request may be detected. For example, rather than asking "Can anyone recommend a good new sedan?", which requests a specific item, a user may post a request such as "Should I buy a new car or a used one?", which asks for more general information. Based on detecting the broad nature of the query, a recommendation for a guide may be generated rather than a recommendation for a specific product. For example, a "How to buy a car" guide may be presented rather than shopping links to cars identified by users responding to the request.

Figure 8:
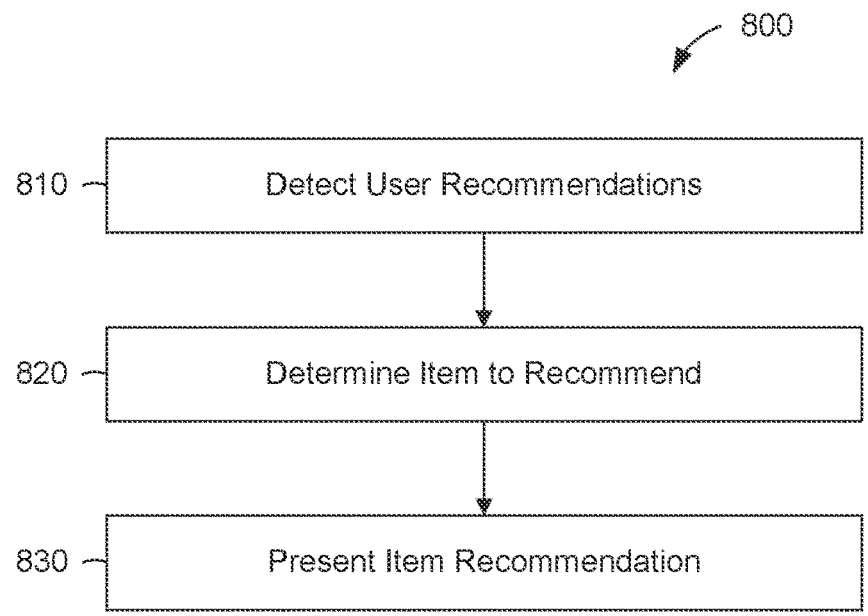
FIG. 8 is a flowchart illustrating operations of an application server in performing a method of social media-based recommendations, according to some example embodiments.

FIG. 8 is a flowchart illustrating operations of an application server 118 in performing methods of social media-based recommendations, according to some example embodiments. Operations in the method 800 may be performed by the application server 118 running a social application 121, using modules described above with respect to FIG. 2. As shown in FIG. 8, the method 800 includes operations 810, 820, and 830.

In operation 810, the application server 118 may receive communications from users (e.g., using the communication module 210) and detect recommendations in the communications (e.g., using the recognition module 220). For example, one user may recommend one brand of shoe, another user may recommend a different brand of shoe, and a third user may up-vote or "like" the first user's recommendation. The detected recommendations may have been sent in response to a query from another user, generated in response to presented content, or spontaneously generated. For example, a web page may provide information regarding popular computer games. The web page may allow comments by visitors. The visitors to the web page may post comments including their opinions on various games. In operation 810, those comments are interpreted to detect recommendations (positive or negative) from users regarding the various games. As another example, a general-purpose forum may allow users to create conversation threads regarding different topics. A user may create a thread to discuss a favorite movie. Other users may respond with their opinion on the favorite movie, and also by expressing opinions about other movies. In operation 810, those opinions are interpreted to detect recommendations from users regarding the other movies.

In operation 820, based on the recommendations from the users, attributes of the requesting users, weights assigned to each recommending user, the time of day, and other factors, an item to recommend may be determined (e.g., by the generation module 230). For example, a shoe of the brand recommended by the first user and liked by the third user that is available at a store that is currently open that is nearest to the user may be determined.

In operation 830, a recommendation for the identified item may be presented (e.g., communicated by the communication module 210 to the client machine 110 for presentation by the user interface module 330 to the user). For example, the recommendation may appear as a response to a user's recommendation request in the conversation thread between the users. In some example embodiments, the recommendation appears as though the recommender were a participant in the thread. As another example, the recommendation may appear at the end of the thread, with new responses from users pushing the recommendation down. As a further example, the recommendation may appear at the bottom of the screen or to one side of the screen, with the position being unaffected by the progress of the thread.

A plurality of recommendations may be presented. The number of recommendations may be predetermined (e.g., one recommendation, three recommendations, etc.) or dynamically determined based on the category of the item, the strength of the recommendations, and so on. For example, if three different items are recommended, but one item is recommended at strength 10 while the others are at strength 1, only the strongest recommendation may be presented. The strength of a recommendation for an item may be the sum of the weights of the recommending users minus the sum of the weights of the users recommending against the item. As another example, an analysis of prior user interactions with recommendations for the category of shoes may show that providing three recommendations increases the probability that the user will interact with one of the items relative to providing only one recommendation. In this example, three recommendations may be provided. The number of recommendations may take into account multiple factors. Combining the examples above, the application server 118 may determine that one recommendation should be presented based on the strength of the recommendation and that three recommendations should be presented based on the category of the recommendation and blend the values to determine that two recommendations should be presented.

Figure 9:
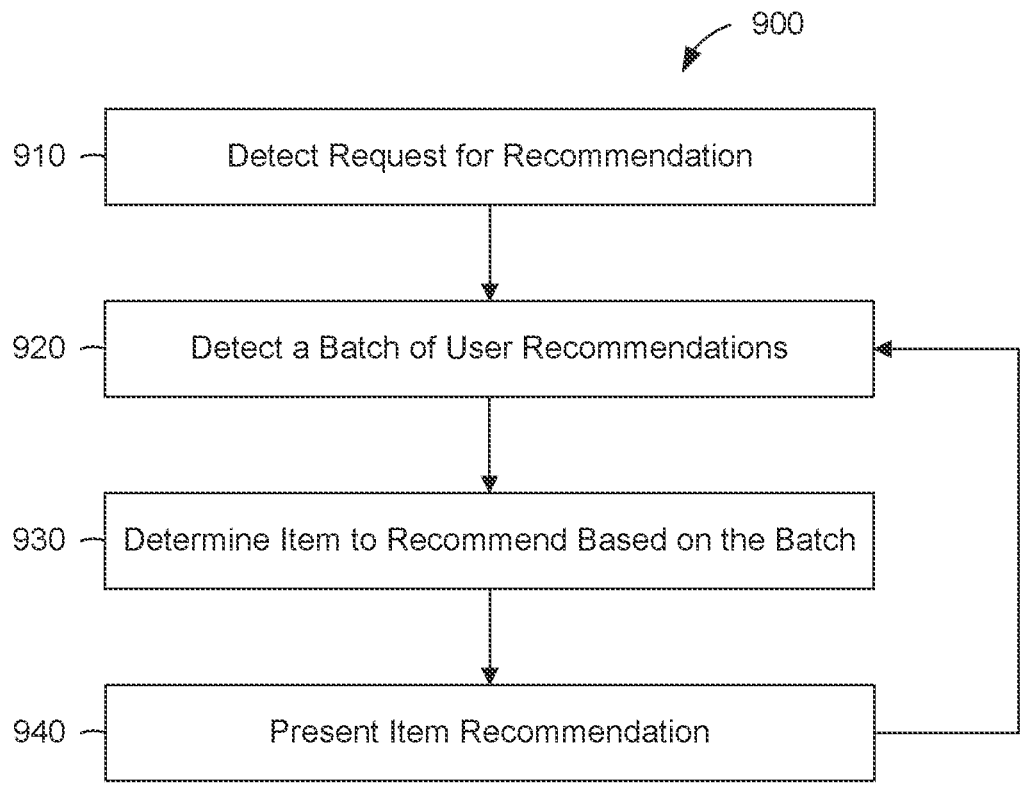
FIG. 9 is a flowchart illustrating operations of an application server in performing a method of social media-based recommendations, according to some example embodiments.

FIG. 9 is a flowchart illustrating operations of an application server 118 in performing methods of social media-based recommendations, according to some example embodiments. Operations in the method 900 may be performed by the application server 118 running a social application 121, using modules described above with respect to FIG. 2. As shown in FIG. 9, the method 900 includes operations 910, 920, 930, and 940.

In operation 910, the application server 118 receives a communication from a user (e.g., by the communication module 210) and detects a recommendation request in the communication (e.g., by the recognition module 220). For example, the user may request a recommendation for a pair of shoes. The request for a recommendation may be the first comment in the thread, or it may be a later comment in the thread. For example, a user may make a social posting describing a recent flight. Another user may ask about how the first user felt about the airline. The first user may respond with a positive or negative recommendation about the airline, while a third user mentions another airline he had a positive or negative experience with. In this example, the question about how the first user felt about the airline may be recognized as a recommendation request.

In some example embodiments, a category of the request may change dynamically. For example, if the first detected request regards a car, and other users begin to respond with comments that identify specific cars, a recommendation for a car may be generated and presented to the user. If a user then mentions that some cars are better than others for installing infant car seats, the subject of the conversation may fluidly change to a discussion of the best car seats available. This change of topic may be detected as a request for a recommendation for an infant car seat. By detecting a change of topic, recommendations for different categories may be generated within a single thread.

In operation 920, a batch of comments is detected (e.g., by the recognition module 220 or the generation module 230). A batch of comments is a set of one or more comments. In some example embodiments, a batch is identified as a set of comments that occur within a set period of time from each other. For example, if the timeout period is five minutes, then as long as fewer than five minutes passes between responses, the batch will continue to grow. Once the timeout period passes without a comment, the batch is complete. To illustrate, seven comments may be received with periods between them of thirty seconds to three minutes. Five minutes after the seventh comment is received, a recommendation may be presented. An hour later, another comment may be received, with no subsequent comments. Five minutes after this comment, another recommendation may be presented.

In some example embodiments, the timeout period for defining a batch of comments is calculated dynamically, based on the momentum of the thread. For example, the time period between the presentation of the request and the first response may be greater than the time period between the first response and the second response, indicating that the thread is gaining momentum. An increase in the time period may be detected as a decrease in momentum, and a recommendation presented when the decrease in momentum is detected. Machine learning algorithms may establish a method for calculating momentum and determining the time to insert the recommendation.

Additionally or alternatively, a batch of comments may have a minimum or maximum size. The minimum and maximum sizes may be the same. For example, a batch may be identified as a set of five comments, regardless of the time between the comments. In other example embodiments, a minimum size is combined with a timeout period. For example, if the minimum size is three comments, a recommendation may be presented after a timeout is detected only if the batch is at least three comments. If the batch is below the minimum size, any additional comments may be added to the batch without regard to the elapsed time. Alternatively, the batch can be allowed to expire after the timeout period, and any new comments added to a new batch.

In operation 930, an item to recommend is determined based on the batch (e.g., by the generation module 230). For example, the methods described above with respect to the operation 820 may be used to determine the item to recommend.

In operation 940, a recommendation for the item is presented. For example, a comment including information about the item can be added to the end of a conversation thread that includes the request and the batch of user recommendations. After the recommendation for the item is presented, the method 900 again checks to see if a batch of user recommendations has been detected (in operation 920). In this way, the method 900 can provide multiple item recommendations in response to a single request for recommendation, one for each detected batch of user recommendations.

Figure 10:
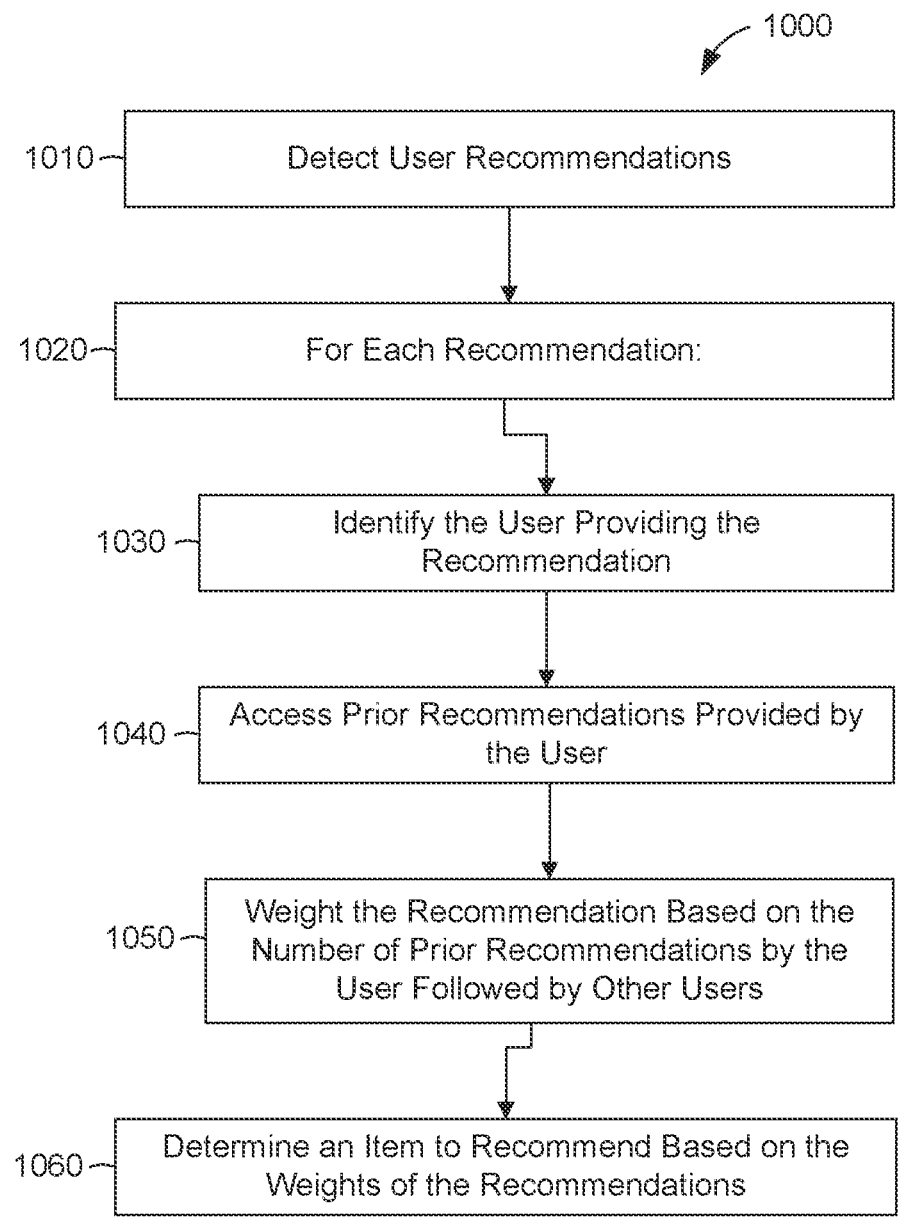
FIG. 10 is a flowchart illustrating operations of an application server in performing a method of social media-based recommendations, according to some example embodiments.

FIG. 10 is a flowchart illustrating operations of an application server 118 in performing methods of social media-based recommendations, according to some example embodiments. Operations in the method 1000 may be performed by the application server 118 running a social application 121, using modules described above with respect to FIG. 2. As shown in FIG. 10, the method 1000 includes operations 1010-1060.

In operation 1010, the application server 118 accesses communications from users (e.g., using the communication module 210 or the storage module 240) and detects recommendations in the communications (e.g., using the recognition module 220). This operation may be performed similarly to operation 810, described above with respect to FIG. 8.

In operation 1020, each detected recommendation is considered, and operations 1030-1050 are performed for that recommendation.

In operation 1030, the user providing the recommendation is identified (e.g., by the generation module 230). For example, the application server 118 may have access to a data record for each comment (e.g., stored by the storage module 240), including a user identifier and the text content of the comment. The text content is analyzed in operation 1010 to identify the recommendation, and the user identifier is accessed in operation 1030 to identify the user providing the recommendation. A record containing the user identifier, the recommendation, the comment, the time of the recommendation, data regarding the user receiving the recommendation, or any suitable combination thereof may be created. As another example, a web-harvesting application may download the text of a web page. The text of the web page may include user names or user photos along with the text of the comments. The text of the comments may be parsed in operation 1010 to identify recommendations. The user names or user photos may be identified based on proximity to the comments as an identifier of the user posting the comment. Accordingly, the web-harvesting application can also create a database that tracks the recommendation activity of users.

In operation 1040, prior recommendations provided by the user are accessed (e.g., from the storage module 240). For example, with reference to FIGS. 5-7, the present recommendation provided by the user may be for a particular make and model of car, but the same user may also be a participant in the conversation of FIG. 4, in which the recommendation was for a brand of shoe. Accordingly, a database containing records with data regarding previous recommendations by the same user may be accessed in operation 1040.

In operation 1050, the recommendation provided by the user is given a weight based on the number of prior recommendations generated from the user that were followed by other users. For example, as discussed above with respect to FIG. 4, when a presented recommendation is followed, a database record for the recommendation can be updated. Thus, all recommendation records linked with the recommending user can be retrieved and analyzed to determine if the recommendation was followed. The weight given to a subsequent recommendation from a user may be increased based on a high number of followed recommendations, a high percentage of followed recommendations, or both. Similarly, a product category for the item recommendation may be stored in the recommendation record. The weight may be determined based on the number or percentage of followed recommendations within the product category for the current recommendation. For example, if the user has made many followed recommendations for shoes, but the current recommended item is a car, the weight given to the user may be lower than if the current recommended item were also for a shoe.

In operation 1060, an item to recommend is determined (e.g., by the generation module 230), based on the recommendations and the weighted values of the recommending users. For example, each user's recommendation may be given a multiplicative value equal to the number of previously followed recommendations plus 1. Thus, where two users recommend a first brand and a third user recommends a second brand, but the first two users have no previously followed recommendations while the third user has 3 previously followed recommendations, a recommendation for the second brand would be made. The first two users would each have a weight of 1 (0+1). The third user would have a weight of 4 (3+1). The weight for the first brand would be 2, the sum of the weights of the first two users. The weight for the second brand would be 4, the weight of the third user. Since the total weight for the second brand is higher than the total weight for the first brand, the item to recommend is determined to be the second brand.

According to various example embodiments, one or more of the methodologies described herein may facilitate social media-based recommendations. According to various example embodiments, one or more of the methodologies described herein may facilitate providing recommendations without accessing private data. For example, an advertisement for a product mentioned in a private email and placed next to the private email may show that the email provider is reading the user's email. By contrast, an advertisement or recommendation for an item recommended in a public or semi-public conversation thread may not implicate the same invasion of privacy. Additionally, one or more the methodologies described herein may facilitate retrieval and presentation of results of interest to a user without requiring the user to explicitly craft a query.

When these effects are considered in aggregate, one or more of the methodologies described herein may obviate a need for certain efforts or resources that otherwise would be involved in identifying items of interest. Efforts expended by a user in identifying relevant items may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
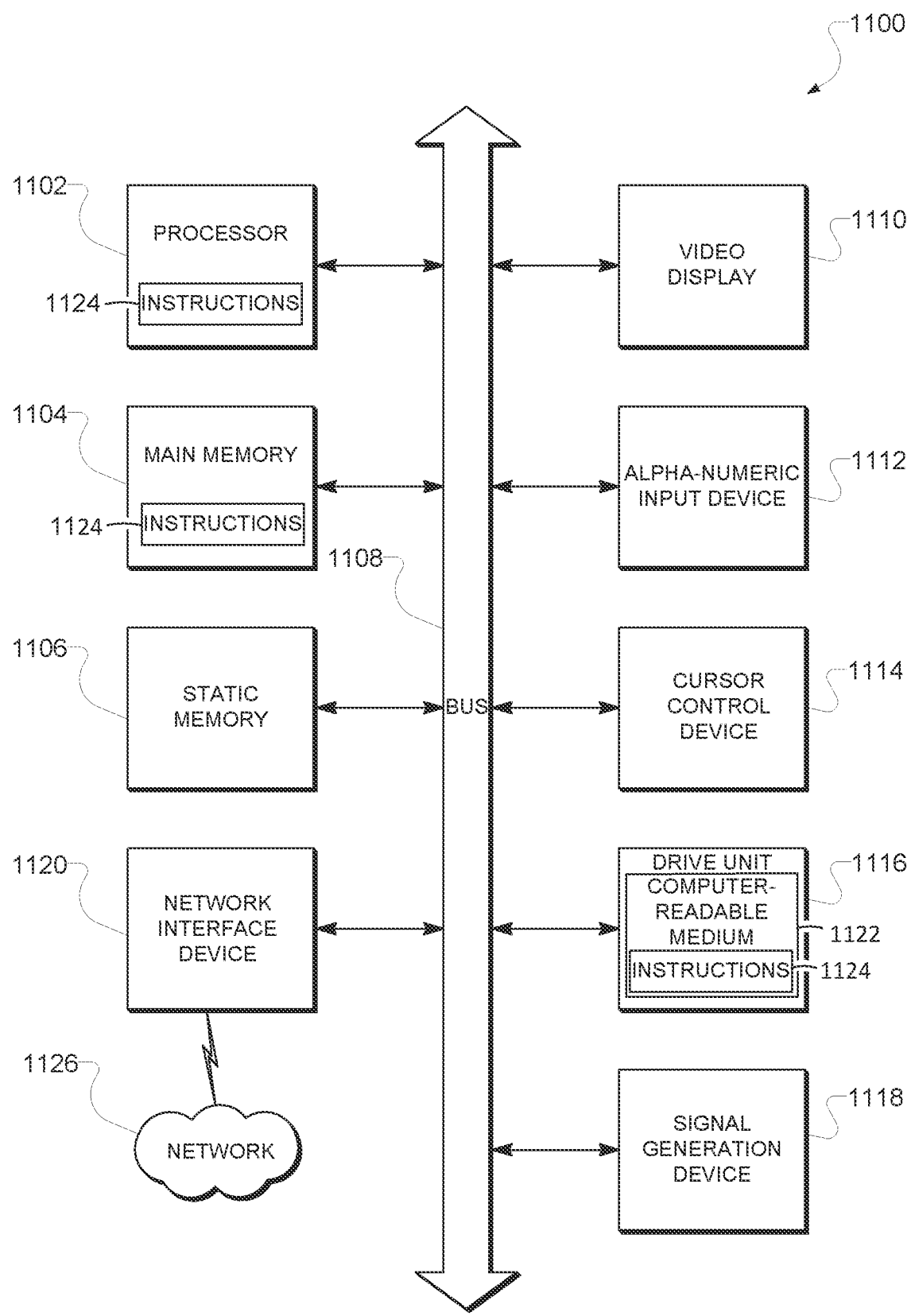
FIG. 11 is a block diagram illustrating components of a machine, according to some example embodiments, able to read instructions from a machine-readable medium and perform any one or more of the methodologies discussed herein.

FIG. 11 is a block diagram of machine in the example form of a computer system 1100 within which instructions 1124 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a tablet, a wearable devic3e (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a disk drive unit 1116, a signal generation device 1118 (e.g., a speaker) and a network interface device 1120.

Machine-Readable Medium

The disk drive unit 1116 includes a computer-readable medium 1122 on which is stored one or more sets of data structures and instructions (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding or carrying instructions for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks, and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving, from a user account, a request for a recommendation of an item provided by one or more other user accounts;
   accessing one or more attributes associated with the user account;
   accessing comments provided by the one or more other user accounts, the comments including one or more of opinions, commentary, or postings related to the item;
   for each of the one or more user accounts, determining a number of previously-followed comments that are different from the accessed comments and were followed;
   parsing the accessed comments to identify a set of items referred to in the accessed comments;
   selecting a recommended item from the identified set of items, the recommended item being selected based on:
      a weight associated with each comment of the accessed comments provided by the one or more other users;
      the number of previously-followed comments for a user account of the one or more other user accounts providing a comment; and
      the one or more attributes; and
   determining that a size of the set of comments exceeds a threshold and a momentum of a thread of the set of comments where at least one or more processor cycles are reduced; and
   generating a user interface that presents information about the recommended item to the user based on the determination.

2. The method of claim 1, wherein the information about the recommended item is presented alongside the accessed comments.

3. The method of claim 1, wherein the information about the recommended item is presented in-line with the accessed comments.

4. The method of claim 1, wherein the method further comprises identifying a location of a user associated with the user account and the selecting of the recommended item is further based on the location of the user.

5. The method of claim 1, wherein the accessing comments provided by the one or more other user accounts includes:
   accessing a set of comments by the one or more other user accounts; and
   for each comment in the set of comments:
      determining if a product is mentioned in the comment; and
      if a product is mentioned, determining if the comment is positive or negative.

6. The method of claim 1, wherein:
   accessing comments includes detecting, for each comment in the accessed comments, a degree to which the comment was agreed with by users; and
   selecting the recommended item from the identified set of items is based on the degree to which one or more comments corresponding to the recommended item were agreed with.

7. The method of claim 1, wherein the accessed comments are a batch of comments, and the method further comprises detecting an end of the batch of comments, the detection based on an elapsed time after a last comment exceeding a threshold without a further comment where the selecting of the recommended item occurs after the detecting of the end of the batch of comments.

8. The method of claim 7, further comprising:
   transmitting the user interface that presents information about the recommended item to the user;
   detecting a beginning of a second batch of comments, the detection based on a first comment after the transmitting of the information about the recommended item;
   detecting an end of the second batch of comments, the detection based on an elapsed time after a second comment exceeding a threshold without an additional comment;
   based on the second batch of comments, selecting a second recommended item; and
   generating and transmitting a second user interface that presents information about the second recommended item to the user.

9. The method of claim 1, wherein the one or more user attributes correspond to interests of the user.

10. A system comprising:
    a processor; and
    a computer readable storage medium storing instructions that, when executed by the processor, cause the system to perform operations comprising:
       receiving, from a user account, a request for a recommendation of an item provided by one or more other user accounts;
       accessing one or more attributes associated with the user account;
       accessing comments provided by the one or more other user accounts, the comments including one or more of opinions, commentary, or postings related to the item;
       for each of the one or more user accounts, determining a number of previously-followed comments that are different from the accessed comments and were followed;
       parsing the accessed comments to identify a set of items referred to in the accessed comments;
       selecting a recommended item from the identified set of items, the recommended item being selected based on:
          a weight associated with each comment of the accessed comments provided by the one or more other users;
          the number of previously-followed comments for a user account of the one or more other user accounts providing a comment; and
          the one or more attributes; and
       determining that a size of the set of comments exceeds a threshold and a momentum of a thread of the set of comments where at least one or more processor cycles are reduced; and
       generating a user interface that presents information about the recommended item to the user based on the determination.

11. The system of claim 10, wherein the operations further comprises identifying a location of a user associated with the user account and the selecting of the recommended item is further based on the location of the user.

12. The system of claim 10, wherein the accessing comments provided by the one or more other user accounts includes:
    accessing a set of comments by the one or more other user accounts; and
    for each comment in the set of comments:
       determining if a product is mentioned in the comment; and
       if a product is mentioned, determining if the comment is positive or negative.

13. The system of claim 10, wherein:
    accessing comments includes detecting, for each comment in the accessed comments, a degree to which the comment was agreed with by users; and
    selecting the recommended item from the identified set of items is based on the degree to which one or more comments corresponding to the recommended item were agreed with.

14. The system of claim 10, wherein the accessed comments are a batch of comments, and the method further comprises detecting an end of the batch of comments, the detection based on an elapsed time after a last comment exceeding a threshold without a further comment where the selecting of the recommended item occurs after the detecting of the end of the batch of comments and the operations further comprise:
    transmit the user interface that presents information about the recommended item to the user;
    detecting a beginning of a second batch of comments, the detection based on a first comment after the transmitting of the information about the recommended item;
    detecting an end of the second batch of comments, the detection based on an elapsed time after a second comment exceeding a threshold without an additional comment;
    based on the second batch of comments, selecting a second recommended item; and
    generating and transmitting a second user interface that presents information about the second recommended item to the user.

15. The system of claim 10, wherein the one or more user attributes correspond to interests of the user.

16. A non-transitory machine-readable storage medium comprising instructions that, when executed by one or more processors of an application server comprising a communication module, a recognition module, and a generation module, cause the application server to perform operations comprising:

receiving, from a user account, a request for a recommendation of an item provided by one or more other user accounts;

accessing one or more attributes associated with the user account;

accessing comments provided by the one or more other user accounts, the comments including one or more of opinions, commentary, or postings related to the item;

for each of the one or more user accounts, determining a number of previously-followed comments that are different from the accessed comments and were followed;

parsing the accessed comments to identify a set of items referred to in the accessed comments;

selecting a recommended item from the identified set of items, the recommended item being selected based on:
  a weight associated with each comment of the accessed comments provided by the one or more other users;
  the number of previously-followed comments for a user account of the one or more other user accounts providing a comment; and
  the one or more attributes; and determining that a size of the set of comments exceeds a threshold and a momentum of a thread of the set of comments where at least one or more processor cycles are reduced; and generating a user interface that presents information about the recommended item to the user based on the determination.

17. The non-transitory machine-readable storage medium of claim 16, wherein the accessing comments provided by the one or more other user accounts includes:

accessing a set of comments by the one or more other user accounts; and for each comment in the set of comments:
  determining if a product is mentioned in the comment; and
  if a product is mentioned, determining if the comment is positive or negative.

18. The non-transitory machine-readable storage medium of claim 16, wherein:

accessing comments includes detecting, for each comment in the accessed comments, a degree to which the comment was agreed with by users; and selecting the recommended item from the identified set of items is based on the degree to which one or more comments corresponding to the recommended item were agreed with.

19. The non-transitory machine-readable storage medium of claim 16, wherein the accessed comments are a batch of comments, and the method further comprises detecting an end of the batch of comments, the detection based on an elapsed time after a last comment exceeding a threshold without a further comment where the selecting of the recommended item occurs after the detecting of the end of the batch of comments and the operations further comprise:

transmit the user interface that presents information about the recommended item to the user;

detecting a beginning of a second batch of comments, the detection based on a first comment after the transmitting of the information about the recommended item;

detecting an end of the second batch of comments, the detection based on an elapsed time after a second comment exceeding a threshold without an additional comment;

based on the second batch of comments, selecting a second recommended item; and generating and transmitting a second user interface that presents information about the second recommended item to the user.

20. The non-transitory machine-readable storage medium of claim 16, wherein the one or more user attributes correspond to interests of the user.

* * * * *